United States Patent [19]
Moisey et al.

[11] Patent Number: 5,153,253
[45] Date of Patent: Oct. 6, 1992

[54] BEARINGS

[75] Inventors: Philip J. Moisey, Rugby; Glyndwr J. Davies, Dunchurch, both of England; Janette Johnston, Kilmarnock, Scotland

[73] Assignee: The Glacier Metal Company Limited, Northwood Hills, England

[21] Appl. No.: 611,699

[22] Filed: Nov. 13, 1990

[30] Foreign Application Priority Data

Nov. 30, 1989 [GB] United Kingdom ............... 8927067

[51] Int. Cl.$^5$ ............... C08K 3/08; C08J 5/14
[52] U.S. Cl. .................... 524/439; 523/149; 523/157; 524/495; 524/520; 524/546
[58] Field of Search ............ 523/149, 157; 524/413, 524/434, 495, 545, 546, 439

[56] References Cited

U.S. PATENT DOCUMENTS

| 4,812,317 | 3/1989 | Bickle | 428/421 |
| 4,824,898 | 4/1989 | Sukigara et al. | 524/546 |

FOREIGN PATENT DOCUMENTS

| 0119815 | 9/1984 | European Pat. Off. . |
| 0218274 | 8/1986 | European Pat. Off. . |
| 2563468 | 10/1985 | France . |
| 870117 | 6/1961 | United Kingdom . |
| 912121 | 12/1962 | United Kingdom . |
| 2131817 | 6/1984 | United Kingdom . |

Primary Examiner—Paul R. Michl
Assistant Examiner—Tae H. Yoon
Attorney, Agent, or Firm—William R. Hinds

[57] ABSTRACT

A bearing material comprising in wt %: 5 to 30 PTFE; 5 to 60 bronze; 1 to 20 graphite; balance PVDF is described together with test results of bearings having a lining of the material.

8 Claims, 1 Drawing Sheet

BEARINGS

The present invention relates to a plastics based bearing material and to a bearing having a lining of the material.

It is known to use polyvinylidene fluoride (PVDF) as the matrix in plastics based bearing materials. Examples of materials employing a PVDF matrix are described in European Pat. No. 44577 and U.S. Pat. No. 4,812,367.

Such materials are commonly bonded to a strong backing via a porous interlayer to key the plastics material to the backing. The laminated material so produced may, for example, be used to form flat sliding surfaces or cylindrical bushes.

Some applications, such as shock-absorber bushes for example, require a very low coefficient of friction, together with high wear and cavitation resistance for successful operation and long life. In one known prior art material, PVDF has been compounded with up to 30 wt% of polytetrafluorothylene (PTFE) which, whilst producing a low coefficient of friction, also tends to lower the wear and cavitation resistance.

It is an object of the present invention to produce a plastics bearing material, based on PVDF which has a low coefficient of friction and a high resistance to wear and erosion.

According to a first aspect of the present invention there is provided a plastics based bearing material, the material comprising in weight %: 5 to 30 PTFE; 5 to 60 bronze; 1 to 20 graphite; balance PVDF.

A preferred composition range comprises; 15 to 30 PTFE; 15 to 35 bronze; 3 to 12 graphite; balance PVDF.

A more preferred composition range comprises; 20 to 27 PTFE; 15 to 25 bronze; 4 to 9 graphics; balance PVDF.

The bronze may contain from 5 to 15 wt% of tin and preferably contains between 9 to 13 wt% of tin.

The bronze preferably comprises a powder of tine particles, all passing through a 300 B.S Mesh sieve.

In a preferred method of making the material the PVDF starting material used to prepare the mixture is in the form of a powder of less than 50 micrometers particle size. It has been found that this material, rather than granules, allow a more homogeneous material to be made which, it is believed, contributes to the superior performance of this material.

In some embodiments, the material may be bonded to a strong backing material such as, steel, copper alloy or aluminium alloy, for example. The backing material may also have bonded to it a layer of a rough or porous material to key the plastics material lining thereto. In the case of steel the layer may comprise bronze particles sintered thereto.

The plastics material lining may be formed into a tape by extrusion and hot-roll impregnated into the porous layer on the backing. The thickness of the tape may be chosen so as to provide a bore machining allowance is subsequently formed bearings or bushes.

The surface of the material may be provided with grooves or indentations in known manner to provide for lubricant retention between the bearing and its co-operating sliding couterface.

In order that the present invention may be more fully understood examples will now be described by way of illustration only with reference to the accompanying drawings, of which:

A batch of plastics material having a composition of 24% PTFE; 20% bronze; 6% graphite; 50% PVDF was made using the following method. 5 Kg of PVDF polymer in the form of a powder of less than 5 micrometers particle size was dry mixed with 2.4 Kg of Fluon L169 (trade mark) PTFE, 2 Kg of −300 B.S. Mesh bronze powder (89% Cu; 11% Sn) and 0.6 Kg of FO-LIAC (trade mark) graphite in a vortex type mixer for 5 minutes. The resulting powder mixture was then fed into a twin screw compounding mixer and extruded as 2 mm diameter strands which, after passing through a cooling water bath were granulated in the normal manner. The granules were then extruded on a single screw extruder into 500 m coils of tape 25 mm wide by 0.2 mm thick. The tape was then hot-roll impregnated into a porous bronze layer which was pre-sintered to the surface of steel strip 1.5 mm thick. The resulting strip had an overall thickness of 1.8 mm including a lining thickness of 0.04 mm above the porous sinter. This material was coded "JGd".

Cylindrical bushes were manufactured from the steel backed strip and tested as described below against a commercially available prior art material having a lining composition of 10% PTFE; 10% lead; balance PVDF, the latter material was coded "KS".

Figure 1:
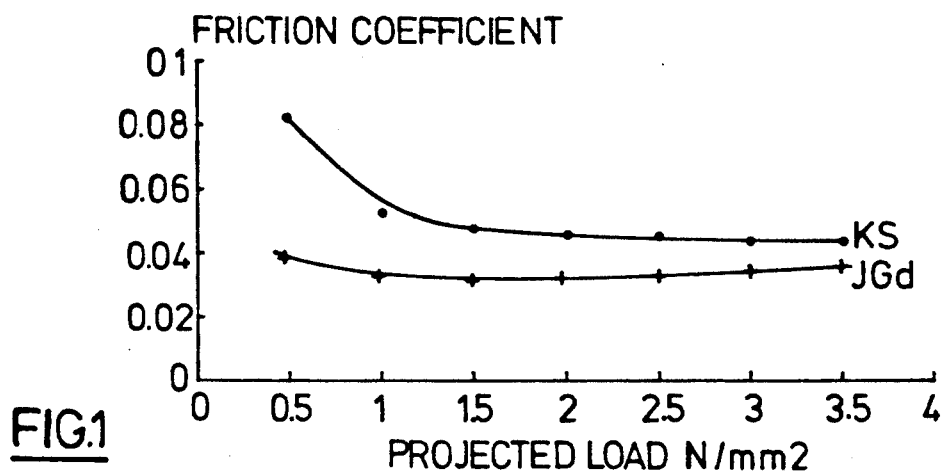
FIG. 1 shows a graph of friction coefficient vs. load for a bearing having a lining material according to the present invention and a prior art material.

FIG. 1 shows the coefficient of friction plotted against projected load in $N/mm^2$ for "JGd" and "KS" materials. The coefficient of friction is lubricated friction, measured via a load cell attached to a reciprocating shaft running in a cylindrical bush to which a radial side load is applied. The projected loads are as specified on the graph. It may be seen that the friction coefficient for the "JGd" material is both significantly lower and more uniform throughout the loaded range than the "KS" material. This is a considerable advantage in applications such as shock absorber strut bushes which have to work over a large range of loading and must have the well known stick/slip friction phenomenon minimized to promote smooth suspension operation in vehicles.

Figure 2:
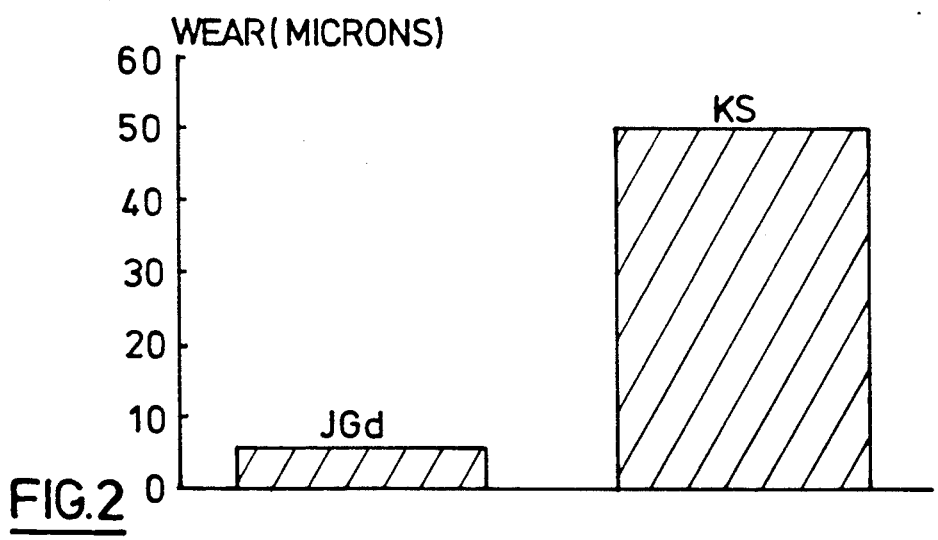
FIG. 2 shows a histogram of wear produced in a simulated shock absorber strut test for the same material as in FIG. 1.

FIG. 2 shows the average wear produced over 12 separate tests of each material in a McPherson type shock absorber strut test rig. The "JGd" material shows a consistently low rate of wear in spite of the high PTFE content. Furthermore, the surface of the "JGd" material showed little or no sign of cavitation pitting, which is a severe problem with modern, lightweight, highly loaded shock absorbers. The "KS" material on the otherhand showed scoring of the lining together with extensive surface pitting in all tested bushes. It may be seen that the average wear of the "KS" material is nearly ten times as great as that of the "JGd" material over the 85 hours duration of each test. The test conditions were a rod diameter of 20 mm, reciprocating over a 90 mm stroke at a frequency of 3 Hz with a 6 l Bar side load.

Figure 3:
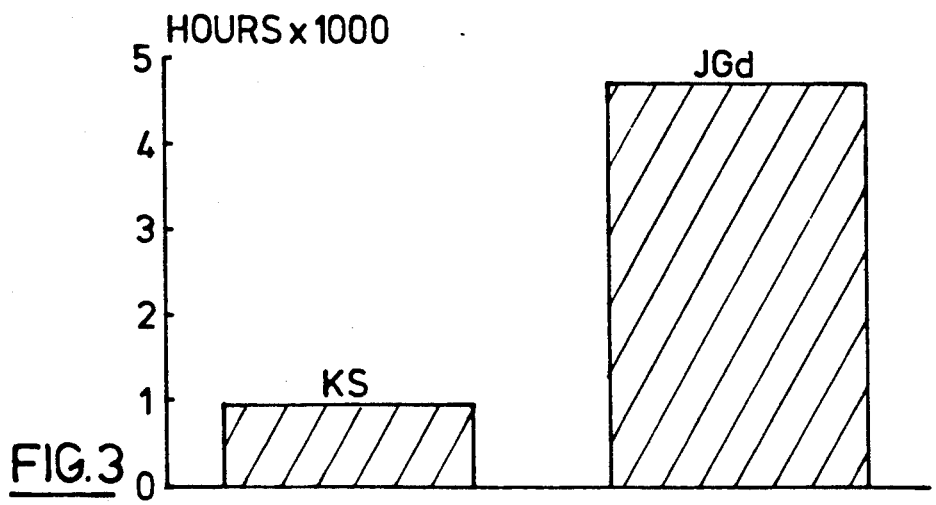
FIG. 3 which shows a histogram of lubricated wear life for the same materials as in FIG. 1.

FIG. 3 shows the lubricated wear life of greased and indented bushes operating at a pressure × velocity factor of 1.4 MPa .m.s. It may be seen that the life expectancy for the "JGd" material is five times that of the "KS" material. The life of the bearing is reached when 0.25 mm of wear has occurred into the lining.

We claim:

1. A plastics based bearing material, said material consisting of in weight % based on total material; 5 to 60 bronze; 1 to 20 graphite; balance PVDF.

2. A bearing material according to claim 1, consisting of in wtT based on total material; 15 to 30 PTFE; 15 to 35 bronze; 3 to 12 graphite; balance PVDF.

3. A bearing material according to claim 1, consisting of in wt% based on total material; 20 to 27 PTFE; 15 to 25 bronze; 4 to 9 graphite; balance PVDF.

4. A bearing material according to claim 1 wherein the PVDF starting material comprises a powder having a particle size of less than 50 micrometers.

5. A bearing material according to claim 1 wherein said bronze contains from 5 to 15 wt% of tin.

6. A bearing material according to claim 5 wherein said bronze contains from 9 to 13 wt% of tin.

7. A bearing material according to claim 1 wherein said bronze is of a particle size which all passes through a 300 B.S Mesh sieve.

8. A bearing having a lining of a material according to claim 1.

* * * * *